(12) United States Patent
Svihla

(10) Patent No.: US 11,519,423 B1
(45) Date of Patent: Dec. 6, 2022

(54) COMPRESSOR JOINT

(71) Applicant: Progress Rail Locomotive Inc., LaGrange, IL (US)

(72) Inventor: Gary R. Svihla, Burr Ridge, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 17/524,426

(22) Filed: Nov. 11, 2021

(51) Int. Cl.
*F04D 29/42* (2006.01)
*F04D 17/10* (2006.01)
*F01D 21/04* (2006.01)
*F02C 6/12* (2006.01)

(52) U.S. Cl.
CPC ....... *F04D 29/4206* (2013.01); *F01D 21/045* (2013.01); *F04D 17/10* (2013.01); *F02C 6/12* (2013.01)

(58) Field of Classification Search
CPC ........ F01D 25/24; F01D 25/243; F01D 25/26; F01D 25/265; F01D 21/045; F04D 17/10; F04D 29/403; F04D 29/4206; F04D 29/4213; F02C 6/12
See application file for complete search history.

(56) References Cited

U.S. PATENT DOCUMENTS

| | | | |
|---|---|---|---|
| 4,721,441 A | 1/1988 | Miyashita et al. | |
| 6,032,466 A | 3/2000 | Woollenweber et al. | |
| 6,364,634 B1 | 4/2002 | Svihla et al. | |
| 6,499,884 B1 | 12/2002 | Svihla et al. | |
| 6,499,969 B1 | 12/2002 | Tombers et al. | |
| 6,896,479 B2 | 5/2005 | Svihla et al. | |
| 7,108,488 B2 | 9/2006 | Larue et al. | |
| 7,371,047 B2 | 5/2008 | Burmester et al. | |
| 7,997,857 B2 * | 8/2011 | Battig | F01D 25/04 415/119 |
| 8,128,865 B2 | 3/2012 | Jahnz et al. | |
| 8,393,851 B2 * | 3/2013 | Schlienger | F01D 21/045 415/203 |
| 8,820,072 B2 | 9/2014 | Figura et al. | |
| 8,858,156 B2 | 10/2014 | Swenson et al. | |
| 9,127,690 B2 | 9/2015 | Knaack | |

(Continued)

FOREIGN PATENT DOCUMENTS

| | | |
|---|---|---|
| CH | 712614 B1 | 11/2020 |
| CN | 205841303 U | 12/2016 |

(Continued)

*Primary Examiner* — Brian P Wolcott
(74) *Attorney, Agent, or Firm* — von Briesen & Roper, s.c.

(57) ABSTRACT

A compressor housing for a turbocharger may include an outer volute having an outer volute inner surface with a clamp groove defined therein, and an inner volute having an inner volute outer surface and an axially facing surface. The inner volute is inserted into the outer volute through the outer volute inner surface with the inner volute outer surface facing the outer volute inner surface. The inner volute is positioned with the axially facing surface disposed axially inward of the clamp groove. A clamp plate includes a radially outward portion inserted into the clamp groove and a radially inward portion extending downward past the inner volute outer surface. The clamp groove and the axially facing surface engage the clamp plate to retain the inner volute within the outer volute when an axial load is applied to the inner volute.

20 Claims, 5 Drawing Sheets

(56) References Cited

U.S. PATENT DOCUMENTS

| | | |
|---|---|---|
| 9,181,855 B2 | 11/2015 | Svihla et al. |
| 9,200,567 B2 | 12/2015 | Parket et al. |
| 9,279,343 B2 | 3/2016 | Knaack |
| 9,470,240 B2 | 10/2016 | Uneura |
| 9,482,240 B2 | 11/2016 | Gerard et al. |
| 9,546,563 B2 | 6/2017 | Panambur et al. |
| 9,726,020 B2 | 8/2017 | Loewenberg |
| 9,835,164 B2 | 12/2017 | Svihla et al. |
| 9,874,099 B2 | 1/2018 | Rexavier et al. |
| 9,915,172 B2 | 3/2018 | Annati et al. |
| 9,995,179 B2 * | 6/2018 | Svihla .................. F04D 29/444 |
| 10,018,205 B2 | 7/2018 | Pinkney et al. |
| 10,119,417 B2 | 11/2018 | Bucking |
| 10,161,265 B2 | 12/2018 | Isayama et al. |
| 10,436,211 B2 | 10/2019 | McArdle et al. |
| 10,677,099 B2 | 6/2020 | Hossbach |
| 2010/0143111 A1 | 6/2010 | Kuehnel |
| 2010/0215506 A1 | 8/2010 | Heyes et al. |
| 2016/0097302 A1 | 4/2016 | Svihla et al. |
| 2016/0177960 A1 | 6/2016 | Svihla et al. |
| 2016/0177965 A1 | 6/2016 | Svihla et al. |
| 2017/0002828 A1 | 1/2017 | Rexavier et al. |
| 2018/0328373 A1 | 11/2018 | Aynacioglu et al. |
| 2020/0182137 A1 | 6/2020 | Carr et al. |
| 2021/0156304 A1 | 5/2021 | Kobielski et al. |

FOREIGN PATENT DOCUMENTS

| | | | |
|---|---|---|---|
| CN | 207728444 U | 8/2018 | |
| DE | 102015216319 A1 | 3/2017 | |
| EP | 2865897 B1 | 4/2016 | |
| JP | 3587350 B2 | 11/2004 | |
| JP | 5598433 B2 | 10/2014 | |
| WO | WO-02090722 A1 * | 11/2002 | ............ F01D 21/045 |
| WO | WO-2015098175 A1 * | 7/2015 | ............. F01D 25/24 |
| WO | WO-2015098826 A1 * | 7/2015 | ............ F01D 21/045 |
| WO | WO-2015151844 A1 * | 10/2015 | ............ F01D 21/045 |

* cited by examiner

COMPRESSOR JOINT

TECHNICAL FIELD

The present disclosure relates generally to turbochargers and, more particularly, to turbochargers with burst containment in the event of turbine wheel or compressor impeller failure.

BACKGROUND

Internal combustion engines, for example, diesel engines, gasoline engines, or natural gas engines, employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a shaft, a turbine wheel connected to one end of the shaft, a compressor impeller (sometimes referred to as a compressor wheel) connected to the other end of the shaft, and bearings to support the shaft. Separate housings connected to each other enclose the compressor impeller, the turbine wheel and the bearings. Exhaust from the engine expands over the turbine wheel and rotates the turbine wheel. The turbine wheel in turn rotates the compressor impeller via the shaft. The compressor impeller receives cool air from the ambient surroundings and forces compressed air into combustion chambers of the engine.

Turbocharger rotors undergo significant stresses over their lifespan due to aerodynamic, thermal and mechanical loads. Impellers experience swings in temperature from inlet variation and the act of compressing the intake air. Mechanical loading from compressing the air combined with centrifugal loads during turning all add up to stresses that can fatigue an impeller over time and fail it before replacement under a normal duty cycle. Material or manufacturing defects may also contribute to a shorter lifespan. To prevent ejection of debris or oil in the event of a turbine wheel or compressor impeller failure and to minimize secondary damage to surrounding housings from those that contained the majority of the energy during the event, turbochargers typically rely on massive housings surrounding the wheels to absorb the tremendous amount of energy released during the failure. The massive housings, however, tend to increase the volume, weight and cost of the turbocharger. In many environments, challenges are presented to design a sufficiently strong housing to contain the energy and debris during a burst event while staying within the size, weight and manufacturing constraints of the environment in which the turbocharger is implemented.

In the case of premature impeller failure where safety of engine operators is to be ensured, the turbocharger housing must contain all fractured components without any expulsion of material or oil that could create a fire hazard. U.S. Pat. No. 9,995,179 to Svihla et al. that issued on Jun. 12, 2018 ("the '179 patent") discloses an example of a compressor assembly configured for turbocharger burst containment to ensure that debris from a failed compressor impeller may be contained within the compressor housing, while ensuring that oil from a bearing housing does not leak out of the turbocharger. Some engine operators require containment capability for a turbocharger operating past nominal maximum speed and temperature to ensure that even the most extreme external engine failure event will not jeopardized containment capability. While a failed impeller generates significant radial load, it also creates axial load due to interaction with the impeller cover and housings. Typically, this energy transfers to the surrounding volute and a joint with the main bearing housing. The joint preloads the impeller cover and this load requirement conflicts with the load required to carry axial burst energy.

SUMMARY OF THE DISCLOSURE

In one aspect of the present disclosure, a compressor housing for a turbocharger that includes a compressor impeller mounted on a rotatable compressor stud is disclosed. The compressor housing may include an outer volute having an annular shape with an outer volute inner surface having a clamp groove defined therein, an inner volute having an annular shape with an inner volute outer surface and an axially facing surface, wherein the inner volute is inserted into the outer volute through the outer volute inner surface with the inner volute outer surface facing the outer volute inner surface, and wherein the inner volute is positioned with the axially facing surface disposed axially inward of the clamp groove, and a clamp plate having a radially outward portion inserted into the clamp groove and a radially inward portion extending downward past the inner volute outer surface, wherein, when an axial load is applied to the inner volute, the clamp groove and the axially facing surface engage the clamp plate to retain the inner volute within the outer volute.

In another aspect of the present disclosure, a compressor housing for a turbocharger that includes a compressor impeller mounted on a rotatable compressor stud is disclosed. The compressor housing may include an impeller cover having an annular shape, a compressor diffuser having an annular shape, an outer volute having an annular shape, a back wall separating the compressor housing from a turbine compressor bearing housing and having the rotatable compressor stud extending therethrough, and an outer volute inner surface having a clamp groove defined therein, an inner volute having an annular shape with an inner volute outer surface and an axially facing surface, wherein the inner volute, the impeller cover and the compressor diffuser are inserted into the outer volute through the outer volute inner surface with the compressor diffuser adjacent to the back wall, the impeller cover is disposed between the compressor diffuser and the inner volute and the impeller cover and the compressor diffuser surrounding the compressor impeller, and wherein the inner volute outer surface is facing the outer volute inner surface and the inner volute is positioned with the axially facing surface disposed axially inward of the clamp groove, a clamp plate having a radially outward portion inserted into the clamp groove and a radially inward portion extending downward past the inner volute outer surface, wherein, when an axial load is applied to the inner volute, the clamp groove and the axially facing surface engage the clamp plate to retain the inner volute within the outer volute, and a clamp bolt connecting the clamp plate to the inner volute.

In a further aspect of the present disclosure, a compressor housing for a turbocharger that includes a compressor impeller mounted on a rotatable compressor stud is disclosed. The compressor housing may include an outer volute having an annular shape with an outer volute inner surface having a clamp groove defined therein, an inner volute having an annular shape with an inner volute outer surface and an axially facing surface, wherein the inner volute is inserted into the outer volute through the outer volute inner surface with the inner volute outer surface facing the outer volute inner surface, wherein the inner volute is positioned with the axially facing surface disposed axially inward of the clamp groove, a plurality of clamp plates each having a radially outward portion inserted into the clamp groove and a radially inward portion extending downward past the inner volute outer surface, wherein the plurality of clamp plates are circumferentially spaced about the clamp groove, and wherein, when an axial load is applied to the inner volute, the clamp groove and the axially facing surface engage the plurality of clamp plates to retain the inner volute within the outer volute, and a clamp bolt associated with each of the plurality of clamp plates connecting the plurality of clamp plates to the inner volute.

Additional aspects are defined by the claims of this patent.

DETAILED DESCRIPTION

Figure 1:
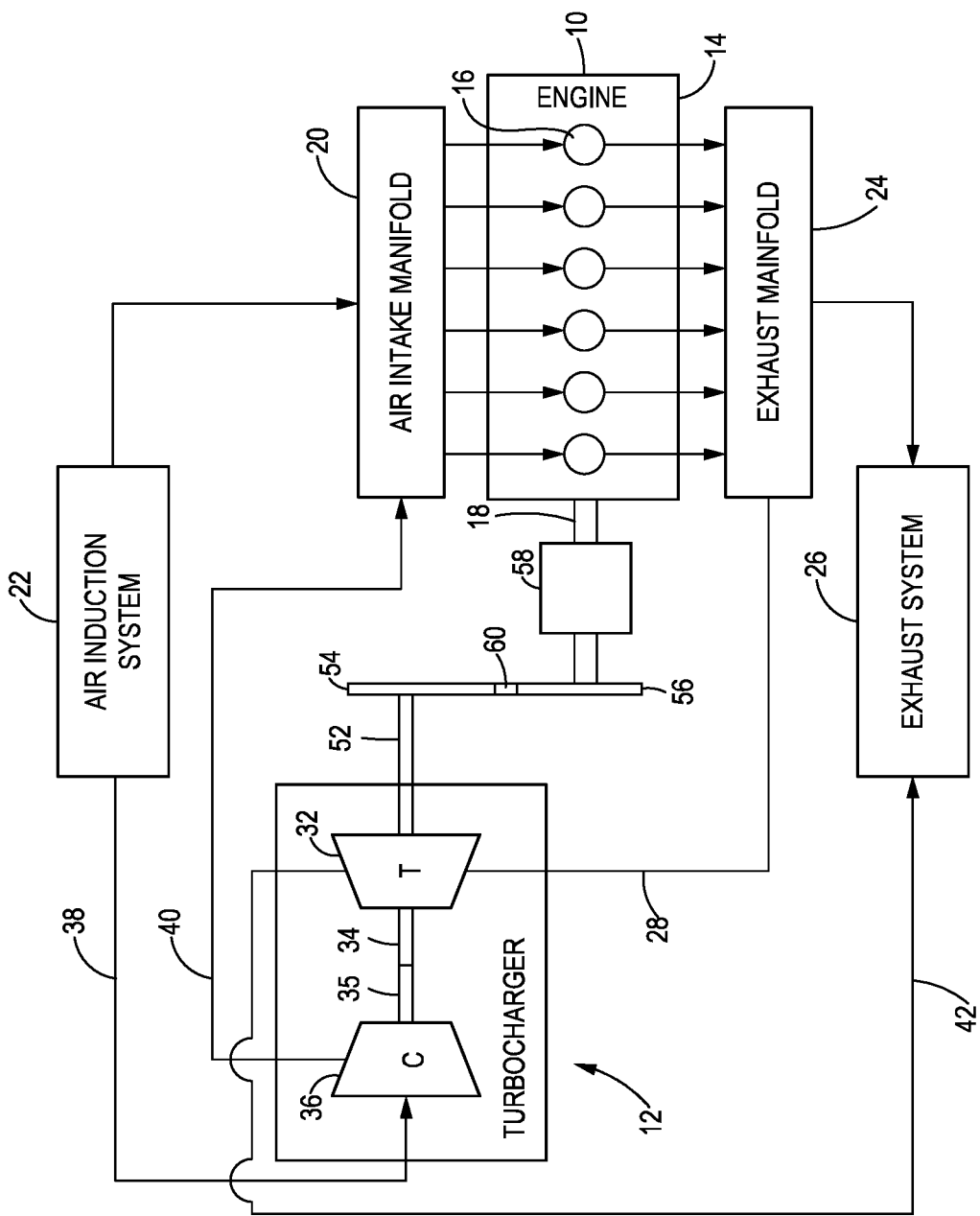
FIG. 1 is a schematic illustration of an exemplary internal combustion engine and a turbocharger in accordance with the present disclosure.

Referring to FIG. 1, an internal combustion engine 10 having an integrated turbocharger 12 in accordance with the present disclosure is illustrated schematically. The engine 10 may find applications in mobile machines (not shown) such as, but not limited to, vehicles, heavy mechanical equipment, large tractors, on-road vehicles, off-road vehicles, marine vessels and the like, and in stationary machines such as generator sets and pumps. The engine 10 may include a crankcase 14 that forms a plurality of compression cylinders 16. While six compression cylinders 16 are shown in an inline arrangement for illustration purposes, fewer or more compression cylinders 16 arranged in inline or alternative configurations within the crankcase 14, for example in a V-configuration, may be used. Each compression cylinder 16 may include a reciprocating piston (not shown) connected to a common engine output shaft 18. In the engine 10, the combustion of a fuel and air mixture in the compression cylinders 16 generates motive power that rotates the engine output shaft 18, and a resultant mixture of exhaust gas is produced as is known in the art.

The engine 10 may include an air intake manifold 20 that is selectively in fluid communication with each compression cylinder 16 and provides compressed intake air to the compression cylinders 16. Air may be provided to air intake manifold 20 by an air induction system 22 that draws air from the ambient atmosphere surrounding the engine 10 and the machine in which the engine 10 is implemented. The engine 10 may include a fuel tank (not shown) to store suitable fuel for combustion in the compression cylinders 16 of the engine 10. In various embodiments, the engine 10 may be configured to combust gasoline, diesel fuel, natural gas (liquefied or compressed) or other combustible energy sources, and the fuel tank will be configured as appropriate to store the fuel and provide the fuel to the engine 10 as required and known in the art. Compressed air from the air intake manifold 20 along with the fuel from the fuel tank provided to the compression cylinders 16 forms a combustible mixture that ignites when compressed or in the presence of a spark. Combustion byproducts are evacuated from each compression cylinder 16 through exhaust valves (not shown) to an exhaust manifold 24 that collects the exhaust gas from each compression cylinder 16, and at least a portion of the exhaust gases may be transmitted to an exhaust system 26 for after treatment prior to being released back into the atmosphere. In the engine 10, the intake air in the air intake manifold 20 as well as the exhaust gas released to the exhaust manifold 24 are under pressure.

In the illustrated embodiment, the turbocharger 12 is integrated with the engine 10 to provide compressed air with greater pressure to the air intake manifold 20. As schematically illustrated in FIG. 1, the turbocharger 12 may be fluidly connected to the exhaust manifold 24 and arranged to receive pressurized exhaust gas therefrom via a high pressure exhaust gas line 28. A turbocharger housing 30 of the turbocharger 12 is configured so that the pressurized exhaust gas from the high pressure exhaust gas line 28 acts on a turbine wheel 32 mounted on a turbocharger shaft 34 within the turbocharger housing 30. The turbocharger 12 may further include a compressor impeller 36 mounted via a compressor stud 35 (FIG. 3) that is coupled to the turbocharger shaft 34 for rotation with the turbocharger shaft 34 and the turbine wheel 32. The pressurized exhaust gas from the high pressure exhaust gas line 28 is directed at the turbine wheel 32 to create exhaust torque on the turbocharger shaft 34. When the exhaust gas temperature and pressure are sufficient, the exhaust torque causes the turbine wheel 32 to rotate the turbocharger shaft 34, the compressor stud 35 and the compressor impeller 36. A compressor stage 62 (FIGS. 2 and 3) of the turbocharger 12 in which the compressor impeller 36 is disposed may receive air from the air induction system 22 via a low pressure air line 38. The rotating compressor impeller 36 compresses the air from the air induction system 22 and outputs compressed air to the air intake manifold 20 via a high pressure air line 40 for addition to the air coming directly from the air induction system 22 and the fuel from the fuel tank. After powering the turbine wheel 32, the spent exhaust gas is discharged to the exhaust system 26 via a low pressure exhaust gas return line 42.

During some operating conditions of the engine 10, it may be desirable to drive the turbine wheel 32 of the turbocharger 12 even though the temperature and pressure of the exhaust gas in the high pressure exhaust gas line 28 are insufficient to rotate the turbine wheel 32 or to rotate the turbine wheel 32 at a desired speed. For example, at low engine speeds such as when the engine 10 is idling, emissions of pollutants such as nitrous oxides (NOx) can increase and low exhaust temperatures can make exhaust after treatment systems in the exhaust system 26 ineffective. In one exemplary embodiment, to selectively provide direct drive to the turbocharger 12 by the engine 10 when the operating conditions dictate, the engine output shaft 18 may drive the turbocharger shaft 34 when the exhaust gas will not drive the turbine wheel 32, and may be disengaged when the exhaust gas will create sufficient torque and rotate the turbine wheel 32 and the compressor impeller 36 at sufficient speeds so that direct drive by the engine 10 is unnecessary.

In an embodiment, a carrier shaft 52 may be operatively coupled to the turbine wheel 32 and may have a carrier drive gear 54 mounted thereon and rotatable therewith. An operative connection between the engine 10 and the carrier drive shaft may be provided by a turbocharger drive gear 56 connected to a gear train or transmission 58 that is driven by the engine output shaft 18. The turbocharger drive gear 56 is operatively connected to the carrier drive gear 54 by one or more idler gears 60 so that the carrier shaft 52 will spin at a desired speed and direction relative to the engine output shaft 18. In other embodiments that utilize a compressor housing 66 (FIGS. 2 and 3) disclosed herein, other appropriate drive mechanisms and arrangements may be utilized to drive the turbine wheel 32 and compressor impeller 36.

Figure 2:
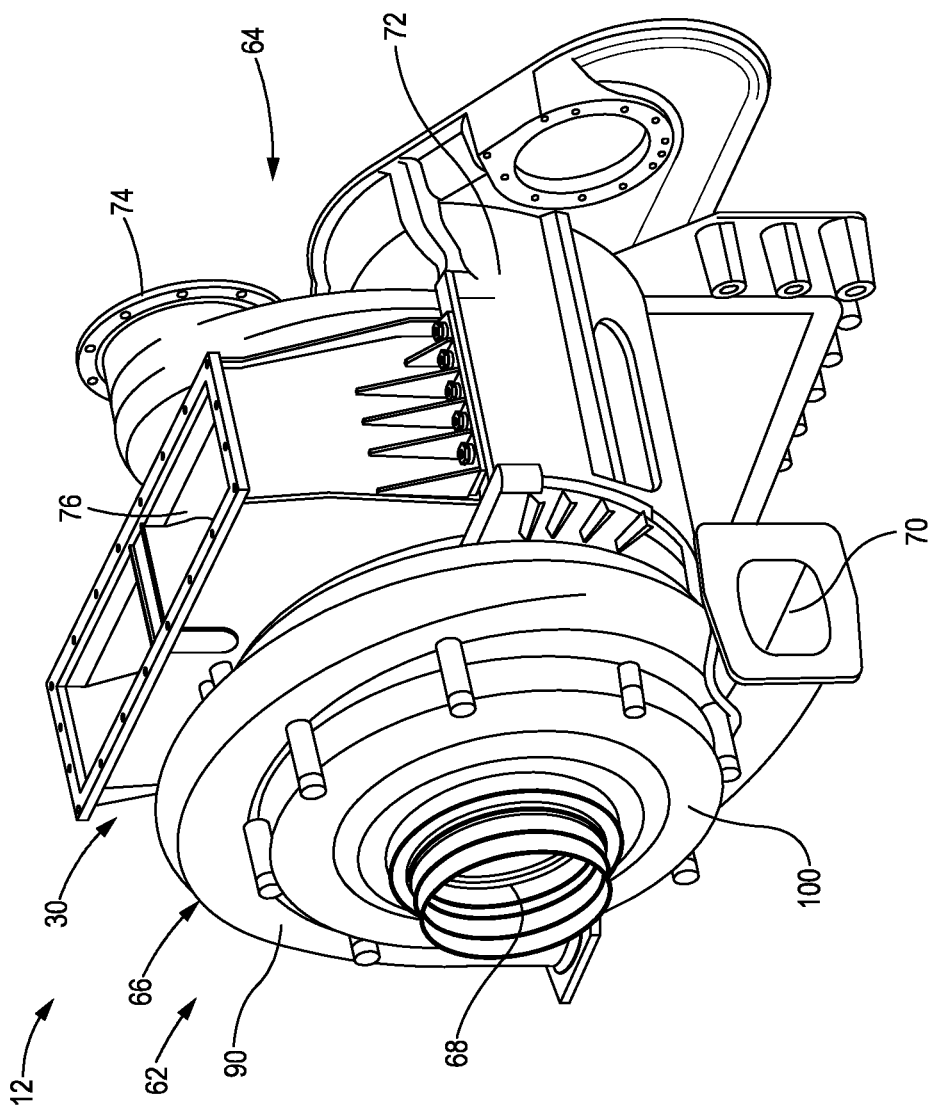
FIG. 2 is a perspective view of an exemplary configuration of the turbocharger of FIG. 1.
Figure 3:
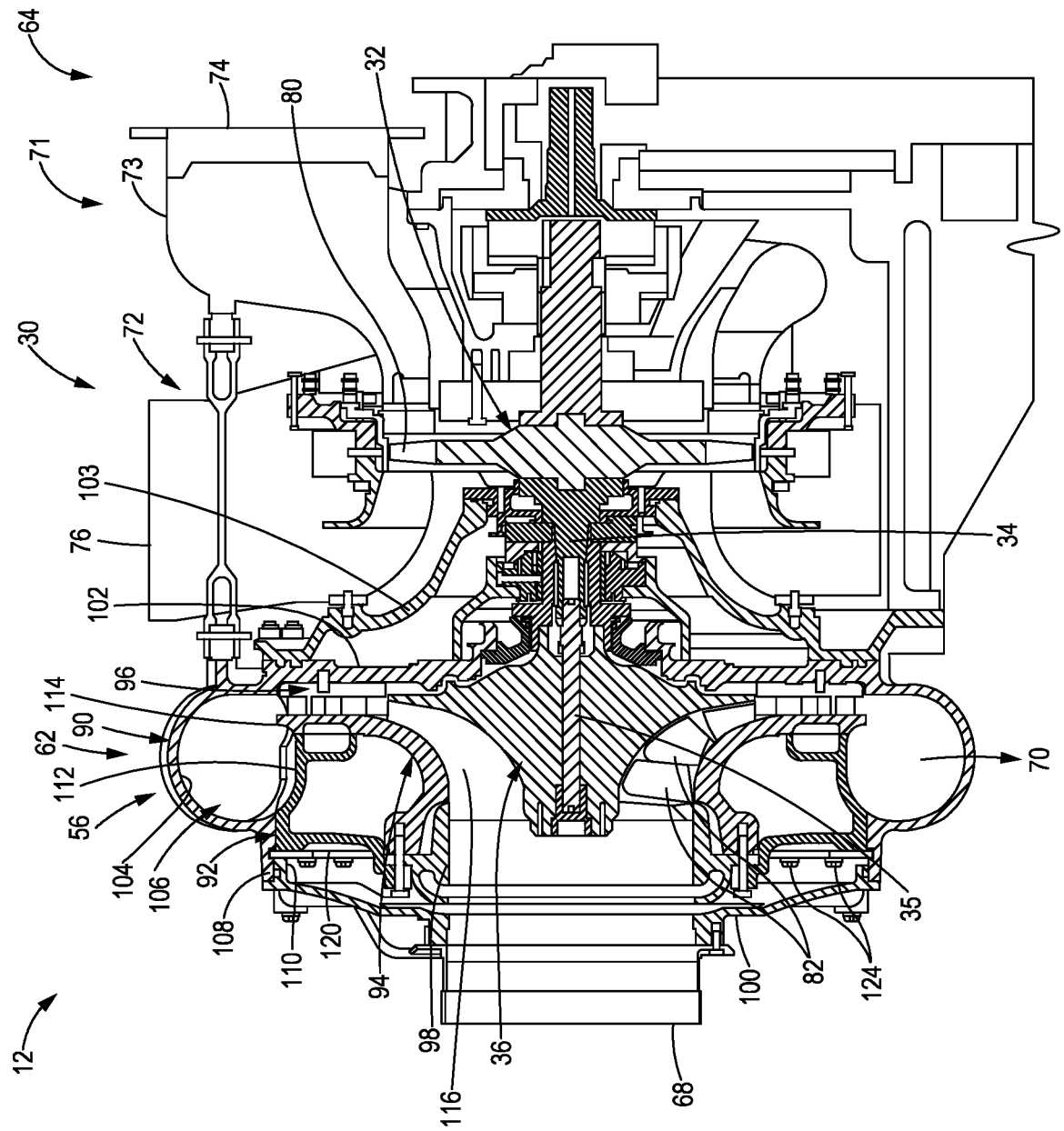
FIG. 3 is a cross-sectional view of an exemplary configuration of the turbocharger of FIG. 2.

FIGS. 2 and 3 illustrate an exemplary embodiment of a turbocharger 12 in accordance with the present disclosure that may be implemented with the engine 10 of FIG. 1. As shown in FIG. 3, the turbocharger 12 may include the compressor stage 62 and a turbine stage 64 disposed in the turbocharger housing 30 (FIGS. 2 and 3). The turbocharger housing 30 comprises the compressor housing 66 and a turbine housing 72. The compressor stage 62 may embody a fixed geometry compressor impeller 36 (FIG. 3) attached via the compressor stud 35, which is coupled to the turbocharger shaft 34, and configured to compress air received from the air induction system 22 (FIG. 1) before the air enters the engine 10 for combustion. Air may enter the compressor housing 66 via a compressor inlet 68 (FIG. 2) and exit the compressor housing 66 via a compressor outlet 70. As air moves through the compressor stage 62, the compressor impeller 36 may increase the pressure of the air that is directed into the engine 10.

In FIG. 3, the turbine stage 64 may include a turbine housing 72 and the turbine wheel 32 that may be operably connected to the turbocharger shaft 34 (which may comprise one or more shafts operably coupled). Exhaust gases exiting the engine 10 may enter a turbine scroll 73 via a turbine inlet 74 and flow toward a turbine exhaust duct 76. The exhaust gases exit the turbine housing 72 via the turbine exhaust duct 76. As the hot exhaust gases move through the turbine housing 72 and expand against the blades 80 of the turbine wheel 32, the turbine wheel 32 may rotate the compressor impeller 36 via the operable connection of the turbocharger shaft 34 and the compressor stud 35. The hot exhaust gases may also heat the turbine housing 72, which in turn may heat the compressor housing 66 and other components of the turbocharger 12 attached to or located near the turbine housing 72. As the compressor impeller 36 is rotated by the turbine wheel 32, air may be drawn axially inward through the compressor inlet 68 toward a center of the compressor impeller 36. Compressor blades 82 of the compressor impeller 36 may then push the air radially outward in a spiraling fashion into the compressor outlet 70 and to the air intake manifold 20.

The compressor stage 62 as illustrated is formed by a series of components including the compressor housing 66 that enclose the compressor impeller 36 and define the airflow channels fluidly connecting the compressor inlet 68 to the compressor outlet 70. The compressor housing 66 may include, among other elements, an outer volute 90, an inner volute 92, an impeller cover 94, a compressor diffuser 96, an insert 98 and a compressor cover 100. The outer volute 90 in the illustrated embodiment includes a back wall 102 that separates the compressor housing 66 from a compressor bearing housing 103, and has the compressor stud 35 extending therethrough. A curved airflow passageway wall 104 may extend generally radially outward from the back wall 102 and wrap around to form a radially outer portion of an airflow passageway 106 that is fluidly connected to the compressor outlet 70. The outer volute 90 may further include an annular outer volute flange 108 with an outer volute inner surface 110 that receives the inner volute 92, the impeller cover 94, the compressor diffuser 96, and the insert 98 therethrough. The inner volute 92 may include a curved bridge wall 112 that combines with an outer end wall 114 of the impeller cover 94 to form a radially inner portion of the airflow passageway 106. The compressor diffuser 96 may be positioned adjacent to and abut the back wall 102 of the outer volute 90, and the outer end wall 114 of the impeller cover 94 may be disposed between the compressor diffuser 96 and the curved bridge wall 112 of the inner volute 92. The insert 98 may be disposed between radially inner end walls of the inner volute 92 and the impeller cover 94. The compressor cover 100 may include the compressor inlet 68, and may be mounted to the outer volute 90 to enclose the components within the compressor housing 66. The impeller cover 94 and the insert 98 may define a compressor cavity 116 around the compressor impeller 36 such that the compressor cavity 116, the compressor diffuser 96 and the airflow passageway 106 define a continuous fluid passage connecting the compressor inlet 68 to the compressor outlet 70.

Compressor containment relies on several combined features to ensure proper energy dissipation and to prevent material or oil escape from the entire turbocharger 12. The compressor impeller 36 is the catalyst for burst impeller events that require compressor containment. During a burst impeller event, pieces detached from the compressor impeller 36 and the compressor blades 82 hit the impeller cover 94 and generate both radial and axial forces on the components of the compressor housing 66. The axial forces can be significant. In normal operation, the impeller cover 94 is only required to have sufficient strength to resist aerodynamic pressure loading, and the strength of the compressor joint required to maintain sufficient clamp load to retain the components of the compressor housing 66 remains low. However, burst forces can overwhelm the clamp load in previous compressor housings. In the case of a two-piece volute with both inner and outer sections, the inner volute applies pressure to the impeller cover to maintain a tight clamp on the compressor diffuser. A compressor joint that bolts all the components together and is designed to withstand burst loads must not produce excessive force that could deform the components from their proper aerodynamic shapes or generate excessive stress in the components.

Figure 4:
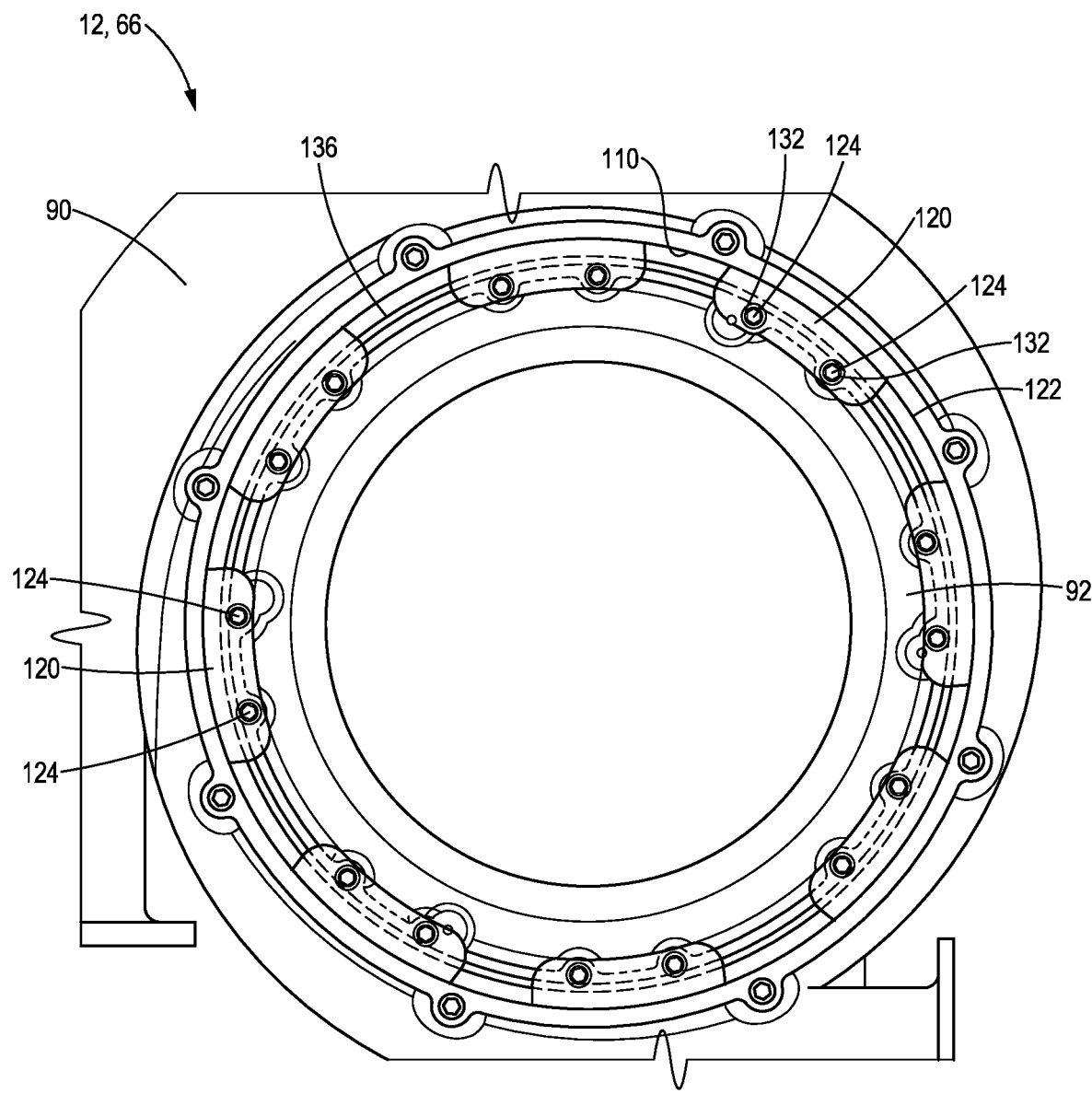
FIG. 4 is a side view of an outer volute, an inner volute and an internal clamp array of a compressor housing in accordance with the present disclosure of the turbocharger of FIGS. 2.
Figure 5:
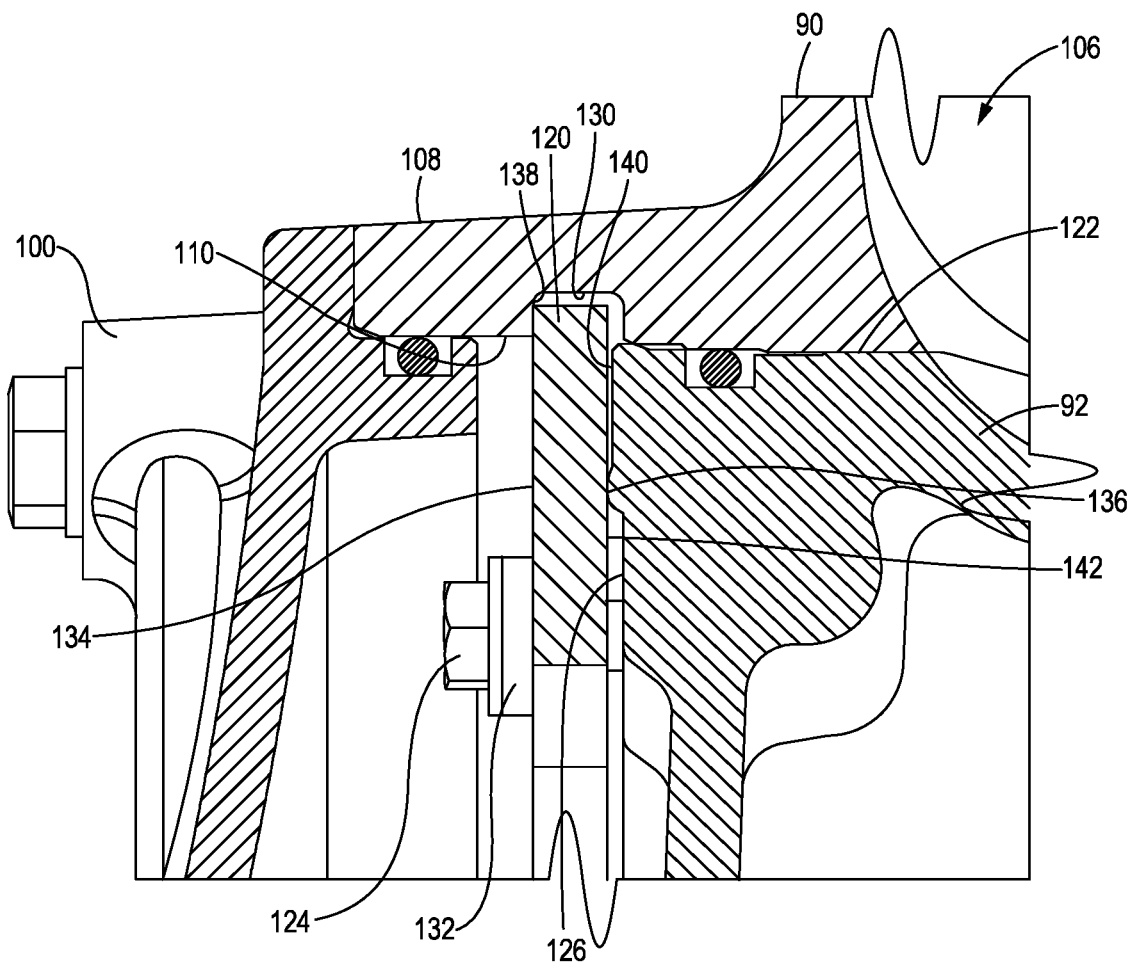
FIG. 5 is an enlarged cross-sectional view of a compressor joint in accordance with the present disclosure of the compressor housing of the turbocharger of FIG. 2.

The compressor housing 66 of the turbocharger 12 in accordance with the present disclosure implements a compressor joint that is capable of withstanding the axial forces in the event of a burst impeller without applying excessive clamping forces to the components of the compressor housing 66 during normal operation of the turbocharger 12. As shown in FIGS. 4 and 5, the compressor joint of the compressor housing 66 may include an internal clamp array with a plurality of clamp plates 120 that are installed at the interface between the outer volute inner surface 110 and an inner volute outer surface 122 (FIG. 5) of the inner volute 92. As seen in FIG. 4 where the compressor cover 100 is removed to reveal the compressor joint at the interface between the outer volute 90 and the inner volute 92, the plurality of clamp plates 120 are circumferentially spaced about the interface and are secured in place by clamp bolts 124 or other appropriate fastening mechanisms anchoring the clamp plates 120 to an axially facing surface 126 of the inner volute 92. While eight clamp plates 120 are illustrated in the present embodiment, those skilled in the art will understand the actual number of clamp plates 120 may vary depending on the structural requirements for a particular embodiment of the turbocharger 12 in which the internal clamp array is implemented.

Referring to FIG. 5, as shown in the enlarged cross-sectional view of the compressor joint between the outer volute 90 and the inner volute 92, the outer volute inner surface 110 at the outer volute flange 108 has an annular clamp groove 130 defined therein. The clamp groove 130 may have a clamp groove axial width that is greater than a clamp plate axial thickness so that radially outward portions of the clamp plates 120 may be inserted into the clamp groove 130. The clamp groove 130 may also have a clamp groove radial depth that is less than a clamp plate radial width of the clamp plates 120 so that the radially outward portions of the clamp plates 120 are received within the clamp groove 130 and radially inward portions of the clamp plates 120 extend across the interface between the surfaces 110, 122 and over the axially facing surface 126 of the inner volute 92. The clamp groove 130 may be axially positioned along the outer volute inner surface 110 proximate to and outward of the axially facing surface 126 when the inner volute 92, the impeller cover 94 and the compressor diffuser 96 are installed within the outer volute 90.

The inner volute outer surface 122 in the illustrated embodiment is configured to allow the clamp plates 120 to apply sufficient clamp loads to the impeller cover 94 and the compressor diffuser 96 during normal operating conditions to withstand the aerodynamic pressure loading, and to resist axial thrust loads during burst impeller events. As described above and illustrated in FIG. 5, the axially facing surface 126 of the inner volute 92 is proximate the installed clamp plates 120. The clamp bolts 124 pass through corresponding bolt openings (not shown) through the clamp plates 120 and are screwed into threaded bores of the inner volute 92 through the axially facing surface 126. Spherical washers 132 may be used with the clamp bolts 124 to create a parallel plane between the bolt heads and the faces of the spherical washers 132 and thereby automatically adjust and compensate for angular deviation between the bolt heads and outward plate surfaces 134 of the clamp plates 120.

To create the clamp load on the inner volute 92, the impeller cover 94 and the compressor diffuser 96, the axially facing surface 126 of the inner volute 92 may have an annular pivot ridge 136 extending axially therefrom and positioned radially between the threaded bores for the clamp bolts 124 and the inner volute outer surface 122. The pivot ridge 136 acts as a fulcrum as the clamp bolts 124 are tightened and apply an axially inward force to the outward plate surfaces 134. An outward groove surface 138 simultaneously engages the outward plate surfaces 134 to prevent rotation of the clamp plates 120 about the pivot ridge 136. Consequently, the axially inward force on the pivot ridge 136 increases as the clamp bolts 124 are tightened, thereby increasing the clamp load on the impeller cover 94 and the compressor diffuser 96.

The arrangement of the clamp plates 120 as illustrated and described allows the clamp plates 120 along with the outer volute 90 and the inner volute 92 to absorb the axial loads encountered during a burst impeller event. As the axial forces created by the burst impeller push the inner volute 92 and the impeller cover 94 axially, the clamp plates 120 are engaged by a thrust reaction surface 140 of the axially facing surface 126 of the inner volute 92 and obstruct the axial movement of the inner volute 92. The dimensions of the clamp plates 120 and the clamp groove 130 prevent the inner volute 92 from being forced past the clamp plates 120. If necessary and as illustrated herein, the thrust reaction surface 140 is disposed radially between the inner volute outer surface 122 and the pivot ridge 136 and extends axially beyond radially inward portions of the axially facing surface 126 to initiate engagement with inward plate surfaces 142 of the clamp plates 120 earlier in the axially movement of the inner volute 92. The early engagement and closeness of the surfaces 140, 142 may further prevent the inner volute 92 from pressing the clamp plates 120 out of the clamp groove 130 during the burst impeller event.

Industrial Applicability

By adding the internal array of clamp plates 120 at the compressor joint between the outer volute 90 and the inner volute 92, the clamp load becomes independent of the ability of the compressor housing 66 to carry a burst impeller load. The clamp bolts 124 may be tightened to create a clamp load sufficient to bear the aerodynamic pressure loads created during normal operation of the turbocharger 12. Varying the size and number of the clamp bolts 124 as well as the radial position of the pivot ridge 136 relative to the clamp bolts 124 and the inner volute outer surface 122/clamp groove 130 allows tuning the compressor joint at the interface of the outer volute 90 and the inner volute 92 for optimum clamp load application.

During a burst impeller event, the inner volute 92 reacts against the clamp plates 120, and the axial burst load is transferred directly to the clamp groove 130 and the outer volute flange 108 of the outer volute 90. With the outer volute 90, the inner volute 92 and the clamp plates 120 sized appropriately, the engagement between the components at the compressor joint can carry much larger axial burst loads in shear than the clamp load required to position the impeller cover 94 and the compressor diffuser 96. Consequently, the clamp bolts 124 implemented with the clamp plates 120 may be significantly smaller than bolts in previous compressor housings that were used to withstand the axial burst loads. Additionally, it may not be necessary to increase the size and strength, and correspondingly the weight and cost, of the compressor cover 100 and bolts attaching the compressor cover 100 to the outer volute 90 with the axial burst loads being absorbed at the compressor joint between the outer volute 90 and the inner volute 92. Even without increasing the load bearing capability of the compressor cover 100, the compressor housing 66 in accordance with the present disclosure is capable of containment of the loads generated in a burst impeller event and preventing debris and oil from escaping the turbocharger 12.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A compressor housing for a turbocharger that includes a compressor impeller mounted on a rotatable compressor stud, the compressor housing comprising:
   an outer volute having an annular shape with an outer volute inner surface having a clamp groove defined therein;
   an inner volute having an annular shape with an inner volute outer surface and an axially facing surface, wherein the inner volute is inserted into the outer volute through the outer volute inner surface with the inner volute outer surface facing the outer volute inner surface, wherein the inner volute is positioned with the axially facing surface disposed axially inward of the clamp groove; and
   a clamp plate having a radially outward portion inserted into the clamp groove and a radially inward portion extending downward past the inner volute outer surface, wherein, when an axial load is applied to the inner volute, the clamp groove and the axially facing surface engage the clamp plate to retain the inner volute within the outer volute.

2. The compressor housing for the turbocharger of claim 1, wherein the clamp plate comprises a plurality of clamp plates each having the radially outward portion inserted into the clamp groove and the radially inward portion extending downward past the inner volute outer surface, and wherein the plurality of clamp plates are circumferentially spaced about the clamp groove.

3. The compressor housing for the turbocharger of claim 1, wherein the clamp plate is secured to the inner volute at the axially facing surface.

4. The compressor housing for the turbocharger of claim 1, comprising a clamp bolt connecting the clamp plate to the inner volute.

5. The compressor housing for the turbocharger of claim 4, wherein the inner volute comprises an annular pivot ridge extending axially from the axially facing surface, and wherein the annular pivot ridge is disposed between the inner volute outer surface and a point of attachment of the clamp bolt to the inner volute.

6. The compressor housing for the turbocharger of claim 5, wherein tightening the clamp bolt to the inner volute increases a clamp force applied to the annular pivot ridge and a clamp load applied to the inner volute.

7. The compressor housing for the turbocharger of claim 5, wherein the axially facing surface comprises a thrust reaction surface extending axially between the inner volute outer surface and the annular pivot ridge.

8. The compressor housing for the turbocharger of claim 7, wherein the annular pivot ridge extends axially from the axially facing surface beyond the thrust reaction surface.

9. A compressor housing for a turbocharger that includes a compressor impeller mounted on a rotatable compressor stud, the compressor housing comprising:
   an impeller cover having an annular shape;
   a compressor diffuser having an annular shape;
   an outer volute having an annular shape, a back wall separating the compressor housing from a turbine compressor bearing housing and having the rotatable compressor stud extending therethrough, and an outer volute inner surface having a clamp groove defined therein;
   an inner volute having an annular shape with an inner volute outer surface and an axially facing surface, wherein the inner volute, the impeller cover and the compressor diffuser are inserted into the outer volute through the outer volute inner surface with the compressor diffuser adjacent to the back wall, the impeller cover is disposed between the compressor diffuser and the inner volute and the impeller cover and the compressor diffuser surrounding the compressor impeller, and wherein the inner volute outer surface is facing the outer volute inner surface and the inner volute is positioned with the axially facing surface disposed axially inward of the clamp groove;
   a clamp plate having a radially outward portion inserted into the clamp groove and a radially inward portion extending downward past the inner volute outer surface, wherein, when an axial load is applied to the inner volute, the clamp groove and the axially facing surface engage the clamp plate to retain the inner volute within the outer volute; and
   a clamp bolt connecting the clamp plate to the inner volute.

10. The compressor housing for the turbocharger of claim 9, wherein the clamp plate comprises a plurality of clamp plates each having the radially outward portion inserted into the clamp groove and the radially inward portion extending downward past the inner volute outer surface, and wherein the plurality of clamp plates are circumferentially spaced about the clamp groove.

11. The compressor housing for the turbocharger of claim 9, wherein the clamp bolt comprises a plurality of clamp bolts connecting the clamp plate to the inner volute.

12. The compressor housing for the turbocharger of claim 9, wherein the inner volute comprises an annular pivot ridge extending axially from the axially facing surface, and wherein the annular pivot ridge is disposed between the inner volute outer surface and a point of attachment of the clamp bolt to the inner volute.

13. The compressor housing for the turbocharger of claim 12, wherein tightening the clamp bolt to the inner volute increases a clamp force applied to the annular pivot ridge and a clamp load applied to the inner volute, the impeller cover and the compressor diffuser.

14. The compressor housing for the turbocharger of claim 12, wherein the axially facing surface comprises a thrust reaction surface extending axially between the inner volute outer surface and the annular pivot ridge.

15. A compressor housing for a turbocharger that includes a compressor impeller mounted on a rotatable compressor stud, the compressor housing comprising:
   an outer volute having an annular shape with an outer volute inner surface having a clamp groove defined therein;
   an inner volute having an annular shape with an inner volute outer surface and an axially facing surface, wherein the inner volute is inserted into the outer volute through the outer volute inner surface with the inner volute outer surface facing the outer volute inner surface, wherein the inner volute is positioned with the axially facing surface disposed axially inward of the clamp groove;
   a plurality of clamp plates each having a radially outward portion inserted into the clamp groove and a radially inward portion extending downward past the inner volute outer surface, wherein the plurality of clamp plates are circumferentially spaced about the clamp groove, and wherein, when an axial load is applied to the inner volute, the clamp groove and the axially facing surface engage the plurality of clamp plates to retain the inner volute within the outer volute; and a clamp bolt associated with each of the plurality of clamp plates connecting the plurality of clamp plates to the inner volute.

16. The compressor housing for the turbocharger of claim 15, wherein the clamp bolt comprises a plurality of clamp bolts associated with each of the plurality of clamp plates connecting the plurality of clamp plates to the inner volute.

17. The compressor housing for the turbocharger of claim 15, wherein the inner volute comprises an annular pivot ridge extending axially from the axially facing surface, and wherein the annular pivot ridge is disposed between the inner volute outer surface and a point of attachment of the clamp bolt associated with each of the plurality of clamp plates to the inner volute.

18. The compressor housing for the turbocharger of claim 17, wherein tightening the clamp bolt associated with each of the plurality of clamp plates to the inner volute increases a clamp force applied to the annular pivot ridge and a clamp load applied to the inner volute.

19. The compressor housing for the turbocharger of claim 17, wherein the axially facing surface comprises a thrust reaction surface extending axially between the inner volute outer surface and the annular pivot ridge.

20. The compressor housing for the turbocharger of claim 19, wherein the annular pivot ridge extends axially from the axially facing surface beyond the thrust reaction surface.

* * * * *